United States Patent
Fechser et al.

(10) Patent No.: US 6,304,993 B1
(45) Date of Patent: Oct. 16, 2001

(54) METHOD AND APPARATUS FOR PERFORMING EFFICIENT RESEEKS IN AN OPTICAL STORAGE DEVICE

(75) Inventors: David A. Fechser; Venitha L. Manter, both of Fort Collins; Steven R. Kemp, Loveland, all of CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/211,129

(22) Filed: Dec. 14, 1998

(51) Int. Cl.[7] ................................................ H03M 13/00
(52) U.S. Cl. ............................. 714/770; 714/758
(58) Field of Search ..................... 714/770, 746, 714/758

(56) References Cited

U.S. PATENT DOCUMENTS

| | | |
|---|---|---|
| 4,866,717 | 9/1989 | Murai et al. ..................... 371/40.3 |
| 4,949,342 | 8/1990 | Shimbo et al. ................... 371/40.1 |
| 5,261,072 | * 11/1993 | Siegel . |
| 5,410,554 | 4/1995 | Watanabe ........................ 371/40.1 |
| 5,499,252 | 3/1996 | Watanabe ........................ 371/40.1 |
| 5,623,459 | 4/1997 | Iwamura et al. ................. 369/32 |
| 5,768,502 | 6/1998 | Ikushima et al. ............... 395/185.07 |

* cited by examiner

Primary Examiner—Phung M. Chung

(57) ABSTRACT

A method and apparatus for performing efficient reseeks in an optical storage device. As data sectors are read by the optical storage device, address information corresponding to sectors being processed by the optical storage device is stored in a stack. The stack may be composed of shift registers that shift the address information of new sectors down the stack as they are read. When an interrupt occurs, a selector determines which stack location contains address information for the sector being processed, and transfers the address information to a register. The address information is held in the register until it is accessed by a microprocessor. The microprocessor uses the address information to determine a reseek location, and causes the sector being processed to be read again.

20 Claims, 5 Drawing Sheets

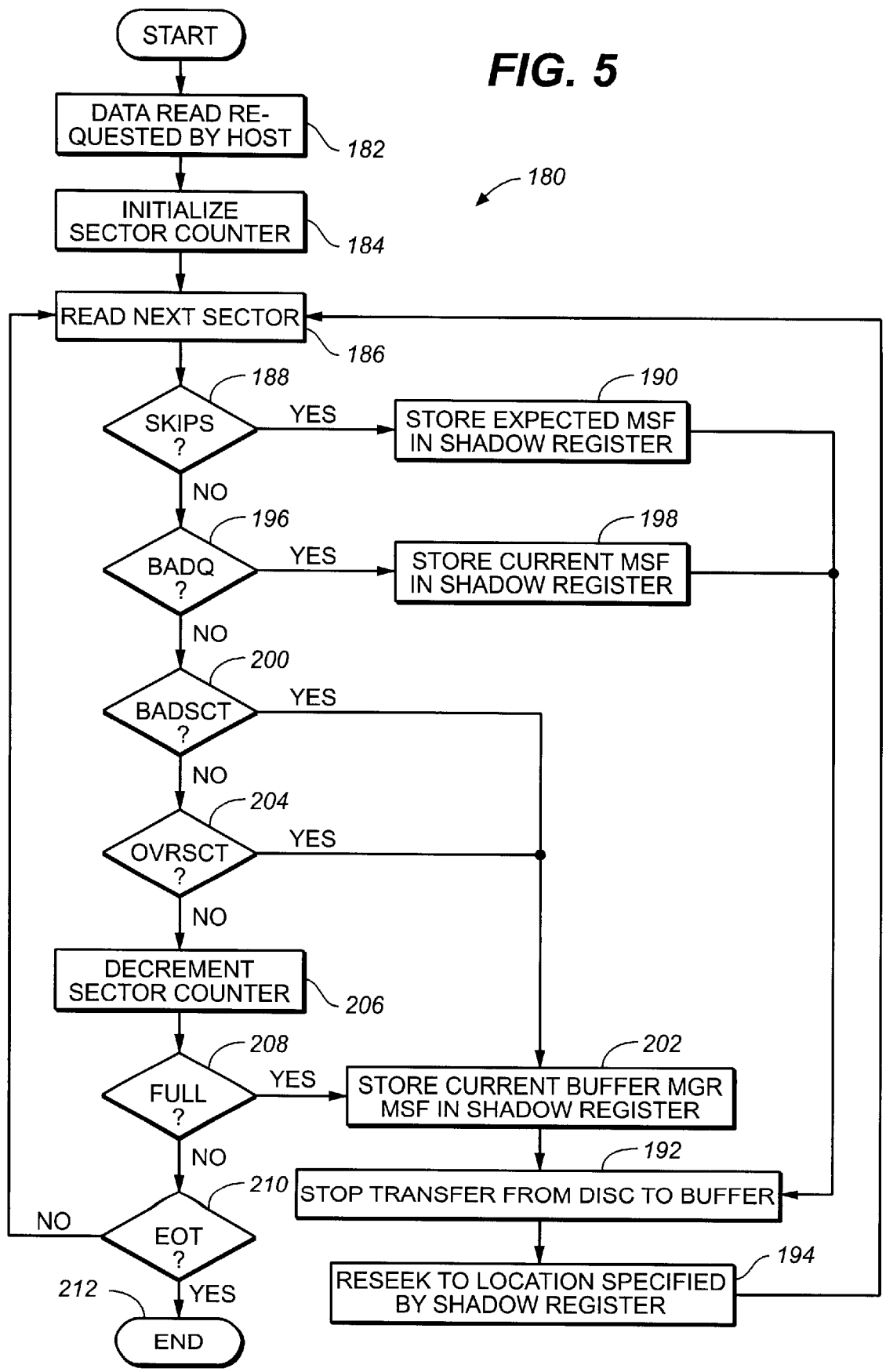

METHOD AND APPARATUS FOR PERFORMING EFFICIENT RESEEKS IN AN OPTICAL STORAGE DEVICE

FIELD OF INVENTION

This invention relates to information storage equipment and more particularly to optical information storage equipment.

BACKGROUND OF THE INVENTION

Different types of information can be digitally represented and stored on optically read discs. Compact Disc (CD) drives and Digital Versatile Disc (DVD) drives may be used to read the information from the discs. Examples of media that may be read using a CD or DVD drive are Compact Disc-Digital Audio (CD-DA), Compact Disc-Read Only Memory (CD-ROM), Compact Disc-Recordable (CD-R), Compact Disc-ReWritable (CD-R/RW and CD-RW), and Digital Versatile Disc-Read Only Memory (DVD-ROM). For more information on several forms of optical storage media refer to the Compact Disc Digital Audio Standard introduced by Philips and Sony, commonly known as "the Red Book," the Compact Disc Read-Only Memory Standard introduced by Philips and Sony, commonly known as "the Yellow Book," the CD-ROM/XA Standard introduced by Philips, Microsoft, and Sony, the Compact Disc Interactive (CD-I) Media Standard, commonly known as "the Green Book," ISO 9660, and the Optical Storage Technology Association (OSTA) MultiRead Specifications for CD-ROM, CD-R, CD-R/RW, & DVD-ROM Devices, Revision 1.11, Oct. 23, 1997, all of which are expressly incorporated herein by reference.

In the early 1990's CD-ROMs were operating at up to the quad-speed (4x) level. In 1998, it is not uncommon to find CD-ROM's operating at 32x and beyond. As speeds have increased, challenges have arisen in the area of error detection and correction, as well as in other areas dependant on control of the CD sectors being serially transferred from the disc to the buffer. When problems relating to data read operations, error checking and control operations, or buffer error conditions, occur it is desirable to quickly and accurately restart the data transfer at the location last accessed. A correct solution should result in the buffer being filled with sequential sectors. There should be no skipped or duplicated sectors.

Currently existing solutions typically do not reposition the data read device at the exact position of the sector being processed when the error condition occurred. Instead, a reseek location is chosen that is several sectors before the sector being processed when the error condition occurred. This is an inefficient use of time, which has become increasingly important as optical storage device speeds have increased. A solution is needed that efficiently repositions the data read device to the location of the sector that was being processed when the error condition occurred.

SUMMARY OF THE INVENTION

In accordance with an illustrative embodiment of the present invention, problems associated with performing reseek operations in an optical storage device are addressed. In an illustrative embodiment, the present invention provides a use of shadow registers to store address information required to continue a data transfer from a CD or DVD. This allows for highly efficient firmware and short reseek times when recovering from nonconforming data read operations, nonconforming error checking or correction operations, or buffer full conditions, for example.

The correct address information to save in the shadow registers is determined by logic circuitry that takes into account the nature of the error condition, along with the specification of the sector being processed when the error condition occurred, to determine which address information will allow the sector being processed to be reread. The shadow registers save the address information of the sector currently being processed by the optical storage device. The microprocessor then can use the address information to reposition the data read device to a reseek location. Providing the needed address information in the shadow register allows for a highly efficient reseek to the optical storage medium in order to restart the transfer of data.

The foregoing and other features and advantages of an illustrative embodiment of the present invention will be more readily apparent from the following detailed description, which proceeds with references to the accompanying drawings.

BRIEF DESCRIPTION OF THE DRAWINGS

These and other objects, advantages, and features of the invention will appear for purpose of illustration, but not of limitation, in connection with FIGS. 1–5, wherein like numbers refer to like parts throughout and in which:

FIG. 5 is a flow diagram illustrating a method for performing efficient data reads according to the present invention.

DETAILED DESCRIPTION OF AN ILLUSTRATIVE EMBODIMENT

Optical Storage Read System

Figure 1:
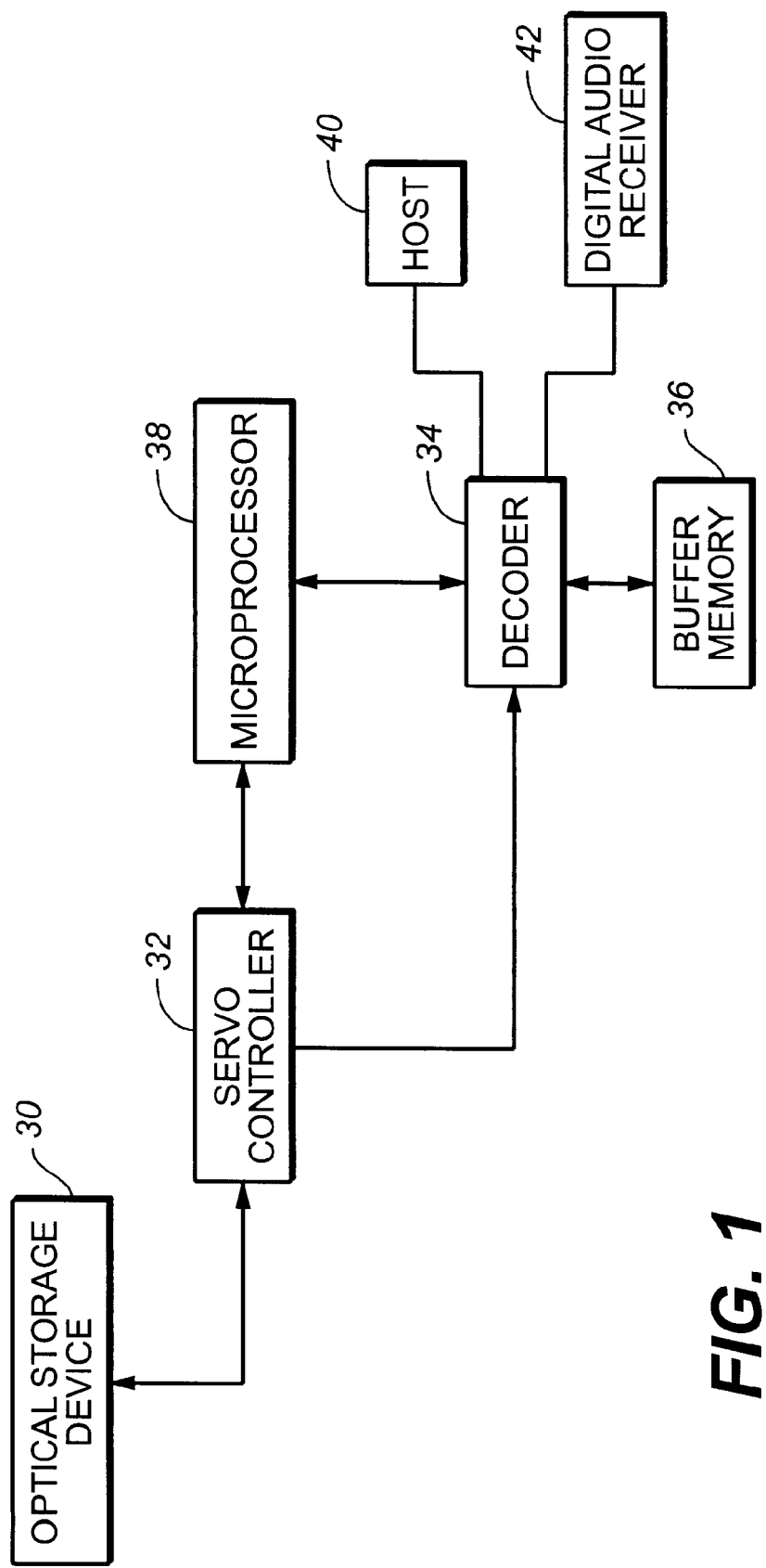
FIG. 1 is a block diagram illustrating an optical storage read system.

FIG. 1 is a block diagram showing an example of a system for reading information from an optical storage device. Optical storage device 30 may be a CD device, or a DVD device, for example. Optical storage device 30 typically includes a spindle motor, a source of light for shining a beam onto the surface of the disk, and an optical pickup for sensing the reflected light beam. The patterns of reflected light correspond to bits of information contained on the disk. Optical storage devices are well known, and detailed description thereof will not be given.

Servo controller 32 drives the spindle motor in optical storage device 30 and performs other functions related to control of the optical storage device 30, such as reseeking. Additionally, raw data from optical storage device 30 is decoded into sector formatted data by servo controller 32.

Decoder 34 detects the format of the optical information, performs error checking and correction, performs data extraction and organization functions, and performs other functions to assist in the retrieval of data from the optical storage device.

Buffer memory 36 serves as a temporary storage location for data, format information, and other information relating to the optical information and data. Decoder 34 coordinates the organization and content of buffer memory 36.

Servo controller 32 and decoder 34 are controlled by microprocessor 38.

Host 40 may be a personal computer (PC) or other device that utilizes data extracted by decoder 34 from information contained on the disk in the optical storage device 30.

Decoder 34 provides an audio interface for providing audio data directly to the digital audio receiver 42, for further processing thereof.

Figure 2:
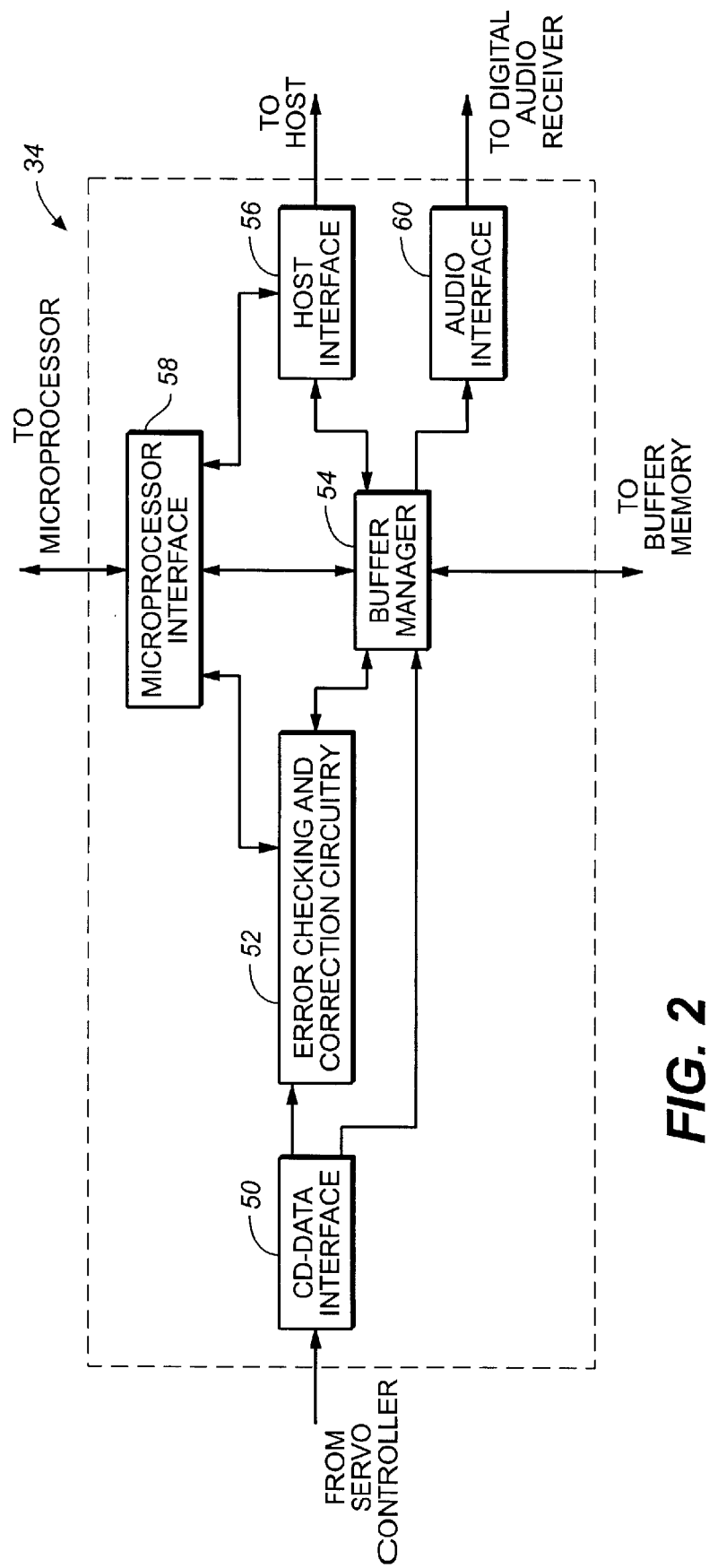
FIG. 2 is a block diagram illustrating a decoder.

FIG. 2 is a simplified block diagram of decoder 34 from FIG. 1. Decoder 34 includes CD-Data interface 50, error checking and correction circuitry (ECC) 52, buffer manager 54, host interface 56, microprocessor interface 58, and audio interface 60. A clock generates a timing signal for coordinating chip operations with the incoming bits of the digital information stream. Decoder 34 may be implemented within a single chip or an integrated circuit (IC). CD-Data interface 50 is responsible for monitoring the sequence of information received from the servo controller 32. CD-Data interface 50 is capable of accommodating interruptions in the data stream received from servo controller 32. CD-Data interface 50 is also capable of sensing the next sequential series of data so it does not create overlapped or gapped data in the buffer memory 36.

CD-Data interface 50 is responsible for determining address information of sectors that are being read. In the preferred embodiment, the address information consists of a specification of the minute, second, and frame (the MSF) containing the current sector. In most cases (CD-ROM, for example), the MSF is decoded from the sector header. In the case of an audio (CD-DA) sector, the MSF is contained in the subcode accompanying the current sector. The MSF can be used to reposition a data read device, such an optical pickup containing a laser beam, to read a particular sector corresponding to the MSF.

CD-Data interface 50 is responsible for determining the format of the incoming stream. Some formats, such as CD-DA, require no error checking or correction, while other formats, such as CD-ROM and CD-ROM/XA, require varying, predetermined levels of error checking and correction.

The CD-Data interface 50 sends data requiring error checking and correction to error checking and correction (ECC) circuitry 52. In one embodiment, ECC circuitry 52 performs REED-SOLOMON third-level CD-ROM error correction on a data block on the fly. This method of error correction is well known. Syndromes and error flags are provided by the servo controller 32. Data is only corrected to the point that data transfer speed is not hindered. Data such as CD-DA format data that does not require error checking or correction is sent directly to buffer manager 54.

Buffer manager 54 controls the buffer memory 36, which may be any form of standard Random Access Memory (RAM), such as EDO-DRAM, for example. Buffer manager 54 also manages the transfer of data from the buffer memory to the host via host interface 56. Buffer manager 54 automatically maintains the integrity of the data in the buffer memory through refresh cycles. Buffer manager 54 also arbitrates requests for access to the buffer memory.

Host interface 56 provides the interface to the host bus. In the preferred embodiment the host bus is a serial bus conforming to the IEEE 1394 standard. Host interface 56 places data into packets for transport onto the host bus. Additionally, host interface 56 may receive commands from the host across the host bus. The host interface 56 then may pass them on to microprocessor 38, which is used as the controller.

Microprocessor interface 58 provides an interface to the microprocessor 38. Microprocessor interface 58 may allow firmware to be downloaded across the host bus to the microprocessor, which may store the code on a flash ROM. In the preferred embodiment, microprocessor 38 and buffer memory 36 are located off-chip. An on-chip microprocessor and/or buffer memory may be used depending on the amount of integration desired.

Figure 3:
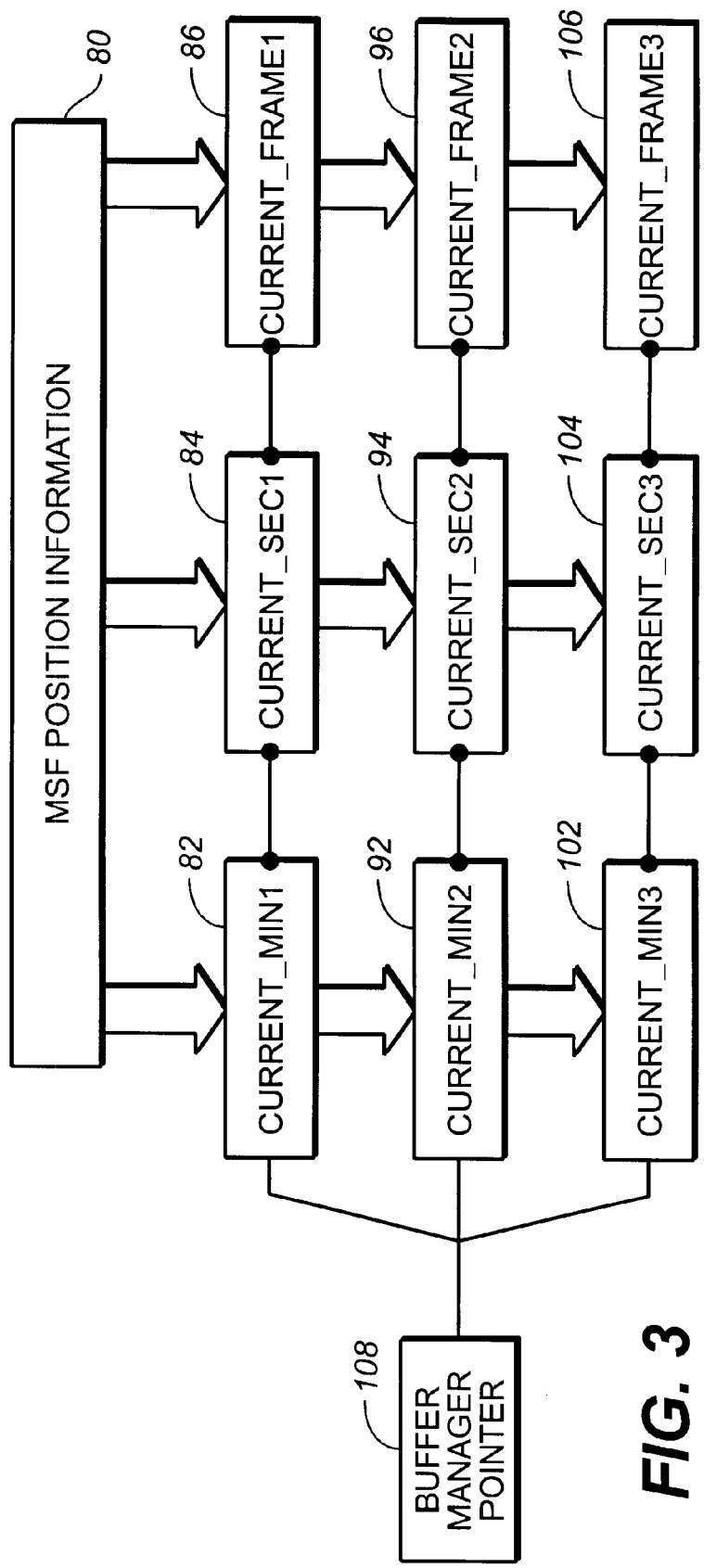
FIG. 3 is a block diagram illustrating a shadow register stack according to the present invention.

FIG. 3 is a block diagram illustrating a shadow register stack according to the present invention. The shadow register stack is located within CD-Data interface 50 in the preferred embodiment. Minute-Second-Frame (MSF) position information 80 is decoded from the sector header if reading a CD-ROM sector, or subcode if reading an audio (CD-DA) sector. This decoding step is well known.

In the preferred embodiment, the stack holds the MSF of the three most recently read sectors. For each of the three most recently read sectors, there are three data storage locations, corresponding to the three address components of a sector (Minute-Second-Frame). Therefore, the stack contains nine total data storage locations, storing three address components for each of the three most recently read sectors. In the preferred embodiment, the data storage locations are implemented by shift registers.

CURRENT_MIN1 82, CURRENT_SEC1 84, and CURRENT_FRAME1 86 are data storage locations in the stack corresponding to the minute, second, and frame respectively of the most recently read sector. CURRENT_MIN2 92, CURRENT_SEC2 94, and CURRENT_FRAME2 96 are data storage locations in the stack corresponding to the minute, second, and frame respectively of the second most recently read sector. CURRENT_MIN3 102, CURRENT_SEC3 104, and CURRENT_FRAME3 106 are data storage locations in the stack corresponding to the minute, second, and frame respectively of the third most recently read sector. The MSF is shifted through the registers making up data storage locations 82–106 as sector data passes through the CD-Data interface 50. MSF information for three sectors are stored because the buffer manager 54 may be up to 2 sectors behind the CD-Data interface due to latencies involved with error checking and correction occurring in ECC circuitry 52. Alternate embodiments may comprise more or fewer shift registers implementing data storage locations in the stack depending on the range of latencies or asynchronicities exhibited for different operations within a optical storage device.

A buffer manager pointer 108 points to the stack locations representing the sector currently being processed by the buffer manager. Since the buffer manager may be up to 2 sectors behind the CD-Data block due to ECC corrections, buffer manager pointer 108 allows a sector to be reread regardless of where an error condition has occurred in the optical storage device. Other pointers may be implemented for other components that may produce error conditions requiring sector rereads.

The buffer manager pointer 108 is incremented each time a new MSF is shifted into the shadow registers in the CD-Data interface 50, and then decremented after the buffer manager completes processing of the current sector. A completed process by the buffer manager 54 may be the writing of the current sector in the buffer memory 36, for example.

Figure 4:
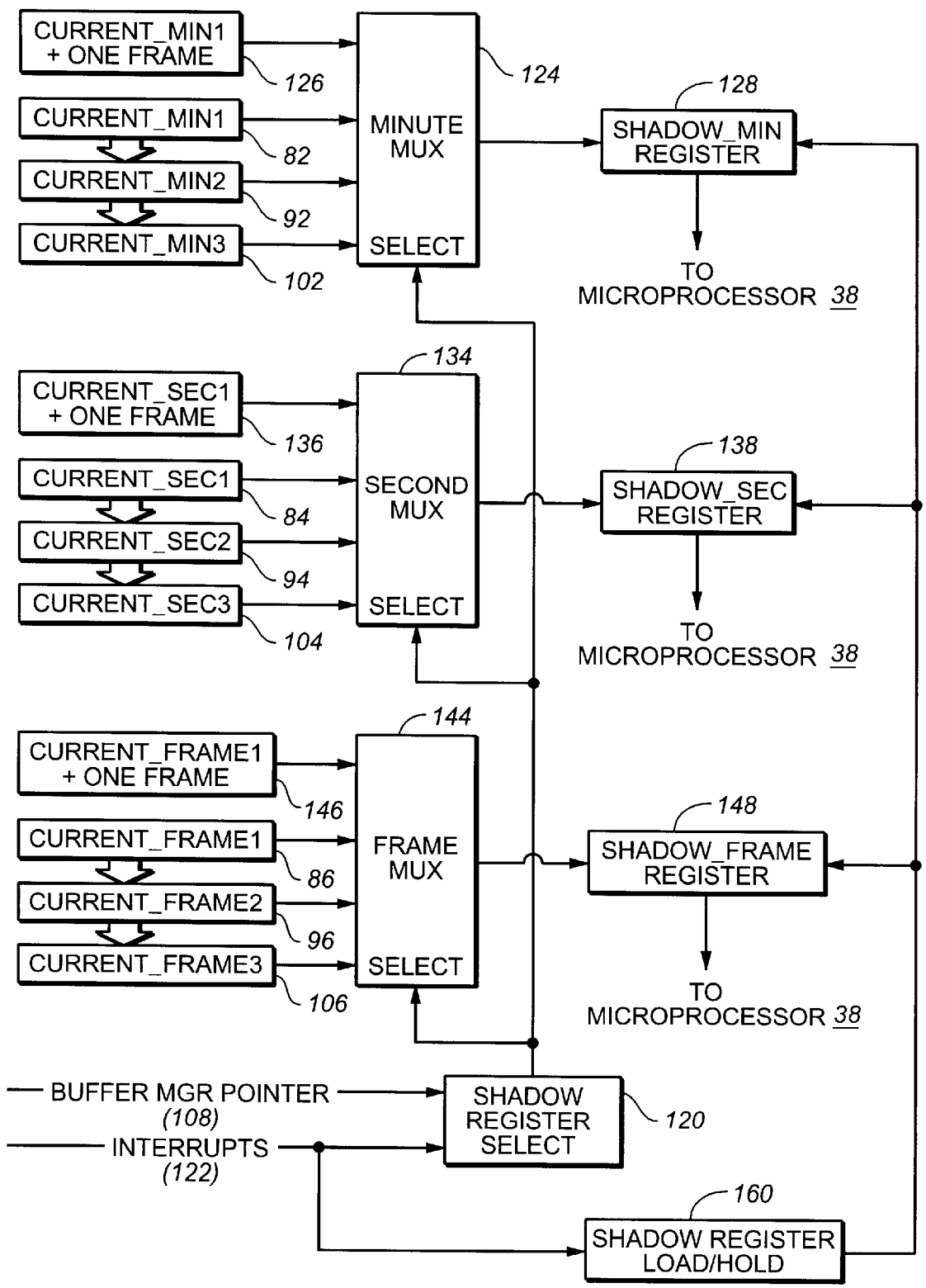
FIG. 4 is a block diagram illustrating the shadow register circuitry of the present invention.

FIG. 4 is a block diagram illustrating shadow register circuitry of the present invention. Data storage locations 82–106 correspond to identically numbered data storage locations shown in FIG. 3. A shadow register selector 120 has a first input from the buffer manager pointer 108, and a second input for interrupts 122. The buffer manager pointer 108 was described with reference to FIG. 3, and provides an indication of which sector is currently being processed by the buffer manager 54. The interrupts 122 are generated by components located throughout decoder 34. In the preferred embodiment, six interrupts are routed to the shadow register selector 120. These interrupts are shown below in Table 1.

TABLE 1

| INTERRUPT NAME | INTERRUPT DESCRIPTION |
| --- | --- |
| SKIPS | sector was not expected or was not sequential |
| BADQ | subcode CRC check failed |
| BADSCT | uncorrectable errors |
| OVRSCT | corrections took too long |
| FULL | allocated buffer space is full |
| EOT | end of transfer |

In Table 1, SKIPS and BADQ, are a result of nonconforming sector read operations, while BADSCT and OVRSCT are a result of nonconforming error checking or correction operations. FULL is a result of a nonconforming buffer operation.

A SKIPS interrupt is generated by the CD-Data interface 50. During a transfer of data from an optical storage medium to a buffer, all sectors read should be sequential. There are sixty seconds in a minute, and 75 frames in a second. For example, Minute 01:Second 23:Frame 17 should be followed by Minute 01:Second 23:Frame 18. Similarly, Minute 13:Second 12:Frame 74 should be followed by Minute 13:Second 13:Frame 00. A step ahead counter is used to predict the next sector, and generate CURRENT_MSF+ONE_FRAME address information that corresponds to the MSF of the next sector to be read. When the header for the next sector is received, its MSF is compared to CURRENT_MSF+ONE_FRAME. If they are not equal, a SKIPS interrupt will be generated.

A BADQ interrupt occurs when a subcode Cyclic Redundancy Check (CRC) has failed. There are 96 bytes of subcode that accompany each sector. A CRC check is performed on the 96 bytes. If the CRC check fails, the BADQ interrupt will be generated.

A BADSCT interrupt occurs when there were more errors than could be corrected in the ECC circuitry. The BADSCT interrupt is generated by the ECC circuitry in the preferred embodiment.

An OVRSCT interrupt occurs when the corrections being performed by the ECC circuitry have taken too long. The ECC can lag the CD-Data interface by two sectors, but if it goes over 2 sectors then data loss will result. The buffer manager 54 will then generate the OVRSCT interrupt.

A FULL interrupt is generated by the buffer manager 54 when the space allocated in buffer memory 36 is full.

An EOT interrupt is generated when all sectors requested by the host 40 have been read.

The shadow register selector 120 monitors interrupt status. When an interrupt occurs, shadow register selector 120 selects the appropriate MSF information for the particular interrupt that occurred, based on where the interrupt was generated and on what sector was currently being processed by the buffer manager 54, as indicated by the buffer manager pointer 108.

CURRENT_MIN1 82, CURRENT_MIN2 92, and CURRENT_MIN3 102 are connected to minute multiplexer 124. A fourth input CURRENT_MIN1+ONE_FRAME 126 is also connected to minute multiplexer 124, and contains minute address information corresponding to the next sequential sector to be read into the CD-Data interface 50. Minute multiplexer 124 has a select input to allow selection of one of the four inputs 82, 92, 102, or 126 to be passed through an output connected to SHADOW_MIN register 128.

CURRENT_SEC1 84, CURRENT_SEC2 94, and CURRENT_SEC3 104 are connected to second multiplexer 134. A fourth input CURRENT_SEC1+ONE_FRAME 136 is also connected to second multiplexer 134, and contains second address information corresponding to the next sequential sector to be read into the CD-Data interface 50. Second multiplexer 134 has a select input to allow selection of one of the four inputs 84, 94, 104, or 136 to be passed through an output connected to SHADOW_SEC register 138.

CURRENT_FRAME1 86, CURRENT_FRAME2 96, and CURRENT_FRAME3 106 are connected to frame multiplexer 144. A fourth input CURRENT_FRAME1+ONE_FRAME 146 is also connected to frame multiplexer 144, and contains frame address information corresponding to the next sequential sector to be read into the CD-Data interface 50. Frame multiplexer 144 has a select input to allow selection of one of the four inputs 86, 96, 106, or 146 to be passed through an output connected to SHADOW_FRAME register 148.

To select a particular MSF, the shadow register selector 120 signals minute multiplexer 124, second multiplexer 134, and frame multiplexer 144 through the select input of each of multiplexers 124, 134, and 144. The selected minute, second, and frame values are then passed through the multiplexers to SHADOW_MIN register 128, SHADOW_SEC register 138, and SHADOW_FRAME register 148 (the shadow registers) respectively.

A shadow register load/hold block 160 monitors interrupt status. When an interrupt occurs, the correct MSF information is selected and loaded into the shadow registers 128, 138, and 148. The shadow register load/hold block 160 then holds the MSF information latched in the shadow registers 128, 138, and 148 until the microprocessor 38 has read all three shadow registers. The delay that occurs before the microprocessor 38 reads the shadow registers may depend on the particular interrupt. In the preferred embodiment, different interrupts are assigned different priorities. These priorities determine how quickly the microprocessor 38 responds to the interrupts. An example response by microprocessor 38 is to read the MSF values stored in the shadow registers and cause a reseek operation to be performed to place a data read device at a reseek location so the sector will be read again.

Thereafter, the shadow registers track CURRENT_MSF1, which corresponds to CURRENT_MIN1, CURRENT_SEC1, and CURRENT_FRAME1, until the next interrupt occurs.

FIG. 5 is a flow diagram illustrating a method 180 for performing efficient data reads according to the present invention. First, a data read operation is requested by the host 40, as shown in step 182. From the data read request, it may be determined how many sectors must be read. A sector counter is then initialized, as shown in step 184. The sector counter is initialized based on the read request from the host 40. In the preferred embodiment, the sector counter is initialized to the number of sectors requested to be read, and is decremented by one with each new sector read. When the counter equals zero, the read operation is complete.

After the sector counter is initialized, the next sector is read, as shown in 186.

After the next sector is read, the interrupts are monitored. Although the interrupts appear to be monitored sequentially in method 180, this is merely one embodiment, and other monitoring sequences or methods may be chosen.

In method 180, it is first determined whether a SKIPS interrupt has occurred, as shown by step 188. A SKIPS interrupt occurs when the sector most recently read is not the next expected sector, or is not sequential. This determination is made by comparing the MSF address information to the CURRENT_MSF+ONE_FRAME address information produced by CD-Data interface 50. If a SKIPS interrupt has occurred, the CURRENT_MSF+ONE_FRAME address information is selected by shadow register selector 120 and is passed through multiplexers 124, 134, and 144 into the shadow registers 128, 138, and 148, as shown in step 190. The transfer of data from the optical storage medium to the buffer is then stopped, as shown in step 192. The microprocessor 38 then causes a reseek operation to occur to the location in the optical storage medium as specified by the shadow registers, as shown by step 194. The next sector is then read again, as shown by step 186.

If no SKIPS interrupt is detected, it is then determined whether a BADQ interrupt has occurred, as shown by step 196. A BADQ interrupt occurs when a subcode Cyclic Redundancy Check (CRC) has failed. If a BADQ interrupt has occurred, the CURRENT_MSF address information is selected by shadow register selector 120 and is passed through multiplexers 124, 134, and 144 into the shadow registers 128, 138, and 148, as shown in step 198. The transfer of data from the optical storage medium to the buffer is then stopped, as shown in step 192. The microprocessor 38 then causes a reseek operation to occur to the location in the optical storage medium as specified by the shadow registers, as shown by step 194. The next sector is then read again causing the data transfer to be resumed, as shown by step 186.

If no BADQ interrupt is detected, it is then determined whether a BADSCT interrupt has occurred, as shown by step 200. A BADSCT interrupt occurs when an uncorrectable error has occurred in ECC circuitry 52. An example of when such a condition might occur is when too many bits in the sector are corrupt, so that it is not possible to perform error checking or correction. If a BADQ interrupt has occurred, the shadow register selector 120 selects the proper MSF information based on the value of buffer manager pointer 108. The MSF address information selected by shadow register selector 120 is passed through multiplexers 124, 134, and 144 into the shadow registers 128, 138, and 148, as shown in step 202. The transfer of data from the optical storage medium to the buffer is then stopped, as shown in step 192. The microprocessor 38 then causes a reseek operation to occur to the location in the optical storage medium as specified by the shadow registers, as shown by step 194. The next sector is then read again, as shown by step 186.

If no BADSCT interrupt is detected, it is then determined whether an OVRSCT interrupt has occurred, as shown by step 204. An OVRSCT interrupt occurs when error checking and correction has taken too long. In order for error checking and correction to be timely, the MSF referenced by the buffer manager pointer 108 is must be no more than two frames behind the MSF of the current sector, CURRENT_MSF. If an OVRSCT interrupt has occurred, the shadow register selector 120 selects the proper MSF information based on the value of buffer manager pointer 108. The MSF address information selected by shadow register selector 120 is passed through multiplexers 124, 134, and 144 into the shadow registers 128, 138, and 148, as shown in step 202. The transfer of data from the optical storage medium to the buffer is then stopped, as shown in step 192. The microprocessor then causes a reseek operation to occur to the location in the optical storage medium as specified by the shadow registers, as shown by step 194. The next sector is then read again, as shown by step 186.

If no OVRSCT interrupt is detected, The sector counter is decremented, as shown by step 206.

It is then determined whether a FULL interrupt has occurred, as shown in step 208. A FULL interrupt occurs when the space allocated in buffer memory 36 is full. If a FULL interrupt has occurred, the shadow register selector 120 selects the proper MSF information based on the value of buffer manager pointer 108. The MSF address information selected by shadow register selector 120 is passed through multiplexers 124, 134, and 144 into the shadow registers 128, 138, and 148, as shown in step 202. The transfer of data from the optical storage medium to the buffer is then stopped, as shown in step 192. The microprocessor then causes a reseek operation to occur to the location in the optical storage medium as specified by the shadow registers, as shown by step 194. The next sector is then read again, as shown by step 186.

If no FULL interrupt has been detected, then it is determined whether an EOT interrupt has occurred, as shown in step 210. An EOT interrupt occurs when all sectors requested by the host 40 have been read. This determination is made by comparing the counter, which has been incremented with each sector read, to the number of sectors originally requested by the host 40. If no EOT interrupt has been detected, then the next sector is read, as shown in step 186. If an EOT interrupt is detected, then the method is at an end, as shown in step 212.

The interrupts described in method 180 are merely exemplary, and other interrupts may be monitored to cause relevant MSF information to be stored in the shadow registers 128, 138, and 148.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for repositioning a data read device upon the occurrence of an interrupt during a transfer of data from an optical storage medium to a buffer, comprising the steps of:
    saving address information in a register;
    stopping the transfer of data;
    repositioning the data read device according to the address information; and
    resuming the transfer of data.

2. The method of claim 1, wherein the data read device is part of an optical disc device.

3. The method of claim 2, wherein the address information identifies an address of a data sector currently being processed by the optical disc device.

4. The method of claim 1, wherein the interrupt is a result of a nonconforming sector read operation.

5. The method of claim 1, wherein the interrupt is a result of a nonconforming error checking or correction operation.

6. The method of claim 1, wherein the interrupt is a result of a nonconforming buffer operation.

7. An apparatus for repositioning a data read device in an optical disc device, comprising:

a decoder for receiving and processing data from an optical disc;

a shadow register stack in communication with the decoder, wherein the shadow register stack contains address information corresponding to sectors being processed by the decoder;

a shadow register for saving address information from the shadow register stack, wherein the address information corresponds to a reseek location;

a microprocessor for repositioning the data read device according to the address information saved in the shadow register.

8. The apparatus of claim 7, further comprising error checking and correction circuitry, wherein the error checking and correction circuitry causes an interrupt to be generated upon an occurrence of a nonconforming error checking and correction operation.

9. The apparatus of claim 8, further comprising a selector for selecting a location in the shadow register stack to be saved in the shadow register upon an occurrence of the interrupt.

10. The apparatus of claim 7, wherein the decoder produces a first interrupt upon an occurrence of a nonconforming data read operation.

11. The apparatus of claim 10, further comprising a selector for selecting a location in the shadow register stack to be saved in the shadow register upon the production of a first interrupt.

12. The apparatus of claim 10, further comprising:

error checking and correction circuitry, wherein the error checking and correction circuitry produces a second interrupt upon the occurrence of a nonconforming error checking and correction operation; and a selector for selecting a location in the shadow register stack to be saved in the shadow register upon the production of the first or second interrupt.

13. A method of processing data contained in sectors on an optical disc comprising the following steps:

receiving a data read request from a host to initiate a data transfer;

initializing a counter;

reading a sector from the optical disc;

processing the sector; and determining whether an error condition has occurred while the sector is being processed, and if not, decrementing the counter.

14. The method of claim 13, further comprising the step of determining whether an error condition has occurred while the sector is being processed, and if so:

saving address information in a register;

stopping the data transfer; and reading the sector from the optical disc by positioning a data read device to read a location specified by the address information.

15. The method of claim 14, wherein the processing step includes an error checking and correction operation.

16. The method of claim 14, wherein the address information is obtained from the counter.

17. The method of claim 14, wherein the error condition is a full buffer condition.

18. The method of claim 14, wherein the error condition is a failed subcode cyclic redundancy check condition.

19. The method of claim 14, wherein the error condition is an untimely sector read condition.

20. The method of claim 14, wherein the error condition is an uncorrectable sector condition.

* * * * *